Oct. 5, 1965  K. T. GRATHWOHL  3,209,409
MOLD FOR PLASTIC SAFETY RAZORS
Filed Nov. 19, 1962  7 Sheets-Sheet 1

INVENTOR
Kenneth T. Grathwohl
BY
Walter W. Burns
ATTORNEY

Oct. 5, 1965   K. T. GRATHWOHL   3,209,409
MOLD FOR PLASTIC SAFETY RAZORS
Filed Nov. 19, 1962   7 Sheets-Sheet 2

INVENTOR
Kenneth T. Grathwohl

BY Walter W. Burns
ATTORNEY

Oct. 5, 1965  K. T. GRATHWOHL  3,209,409
MOLD FOR PLASTIC SAFETY RAZORS
Filed Nov. 19, 1962  7 Sheets-Sheet 4

INVENTOR
Kenneth T. Grathwohl

BY Walter W. Burns
ATTORNEY

Oct. 5, 1965  K. T. GRATHWOHL  3,209,409
MOLD FOR PLASTIC SAFETY RAZORS
Filed Nov. 19, 1962  7 Sheets-Sheet 7

INVENTOR
Kenneth T. Grathwohl
BY
Walter W. Burns
ATTORNEY

United States Patent Office 3,209,409
Patented Oct. 5, 1965

3,209,409
MOLD FOR PLASTIC SAFETY RAZORS
Kenneth T. Grathwohl, 508 Sterling Place,
Greenport, N.Y.
Filed Nov. 19, 1962, Ser. No. 238,341
10 Claims. (Cl. 18—36)

This invention relates to safety razors and specifically to molds for making those safety razors which are meant to be of a cheap construction and of a disposable nature.

The primary object of this invention is the provision of an improved mold for making safety razors.

Another object of the invention is the provision of an improved mold for making safety razors wherein the razor blade is cast permanently in place in the body of the razor.

Another and further object of the invention is the provision of a duplex or double mold for simultaneously making two safety razors utilizing a half portion of a regular double-edge safety razor blade by simultaneously casting two razor bodies, each body being around one half-blade and then breaking the double-edge razor blade in two pieces along lines near the ends of the blade, so that when finished, there will be one half of a two-edge razor in each of two razor bodies.

Another and still further object of the invention is the provision of means which are preferably placed at the corners of the whole blade to firmly hold the halves of the whole blade in position for casting—even though the halves of the blade should break apart during or prior to the casting operation.

Another and further object of the invention is the production of a mold for making safety razors which will take in complete two-edge blades, flex them to their proper angle to produce two unitary constructions which become a part of each of two razors with their blade-parts embedded in the structure of each of two razors, the handles of the razors being substantially parallel as cast.

Another and still further object of the invention is the provision of a two-part casting mold to receive a two-edge razor blade with projections extending from the inner surface of the mold into the interior of the mold and against the razor blade to bend the blade to force the two cutting edges into proper relative position with the respective bodies to form cutting edges of the two finished razors.

A still further object of the invention is the provision of a two-part mold for the casting of a pair of safety razors wherein there are oppositely disposed projections extending from each side of the mold to contact a double-edge two-part blade to rigidly hold the two-part blade between the projections while the two razors of the pair are cast around the blade to form the pair of razors.

Still another and further object of the invention is the provision of a mold for casting a pair of safety razors wherein oppositely disposed projections extend into the mold space, some of which are resiliently operated, the projections pressing onto the opposite sides of a two-edge razor blade to hold the same in place while the casting operation takes place.

A still further object of the invention is the provision of a mold wherein means are provided for the holding of a two-edge razor centralized by means of a centerizing fin during the casting operation, which fin is removed from its holding position by a knockout device after the casting operation.

Still another and further object of the invention is the provision of an improved mold for a safety razor, the body of which is cast with a slightly tapered handle integral with the body of the safety razor, the handle having a tapered hollow interior.

A still further object of the invention is the provision of a mold having knock-out pins distributed in the mold to simultaneously lift the razors and handles from the mold.

Other and further objects of the invention will be apparent from the consideration of the complete specification and drawing.

Referring to the drawing wherein is illustrated an embodiment of my invention,

FIG. 14ᵃ is a detail view of the top of the lower mold section from the line 14ᵃ—14ᵃ of FIG. 14—without the blade.

FIG. 16ᵃ is an end view of a blade showing its openings 18ᶻ which assist in the distribution of the molten casting material.

FIG. 21 is a top plan view of the razor in place on the lower mold and partly broken away with the stop guides 50 shown in their operative positions relative to the razor blade.

In carrying out this invention, each of two bodies of two safety razors are cast around one-half of a whole safety razor blade and after being fabricated in pairs, the razor bodies, held together by the whole razor blade, are broken apart, severing the razor blade at its ends or other weak parts, thus forming two complete razor bodies, each including the half blade about which it has been molded.

I will first describe the construction of the completed razor.

Figures 6, 7, 8, 9, 10, 11, 12:
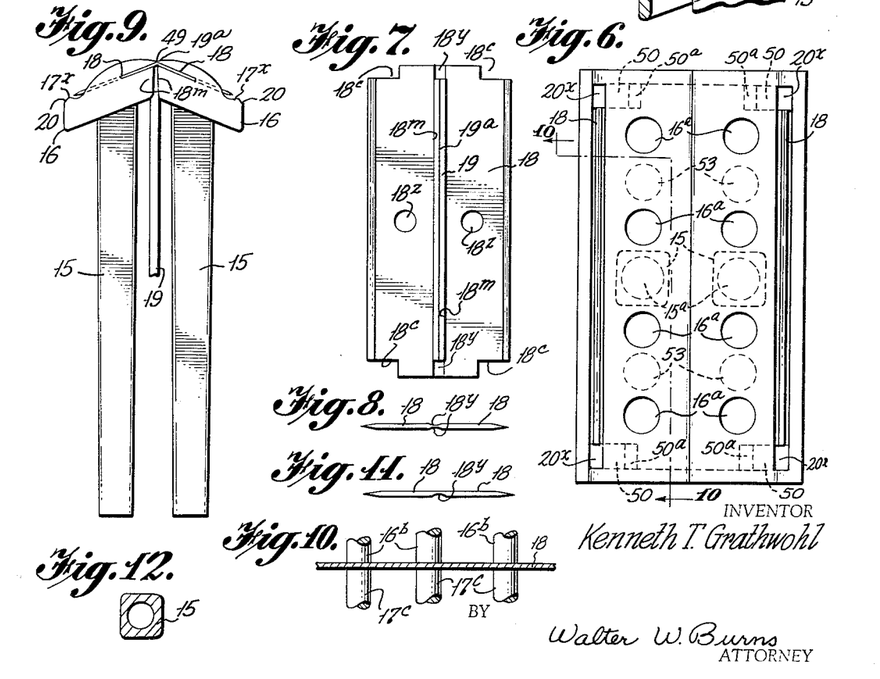
FIG. 6 is a top plan view of the pair of safety razors as they are cast together in one piece, the positions of the knock-out pins being indicated.
FIG. 7 is a plan view of the whole safety razor blade as used when casting two razor bodies around it before the two halves of the blade are broken apart, the position of the edge 19ᵃ of the fin 19 being indicated.
FIG. 8 is an end view of the razor blade with the thickness of the blade much exaggerated to show the grooves in the blade for the purpose of weakening it for easy breaking and separating after the body parts are cast together around the razor blade as shown in FIGS. 6 and 9.
FIG. 9 is an end view of the showing in FIG. 6.
FIG. 10 is a detail view of the razor blade 18 being held in place by the pins 16ᵇ and 17ᶜ.
FIG. 11 is a view similar to FIG. 8, but showing the blade weakened on one side only.
FIG. 12 is a detail view of a cross-section of the square-type handle of the safety razor.

Referring in detail to the drawing, a handle 15 is provided for handling and control of the safety razor. This handle is hollow and preferably square, as shown in FIGURE 12, to reduce the amount of plastic or other material from which it is made and also to cause a core nearly uniform in thickness to be obtained throughout the body of the razor.

Figure 1:
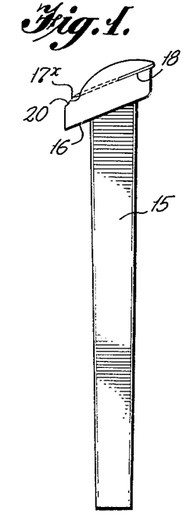
FIGURE 1 is a side view of a razor produced by my improved mold.
Figures 2, 3, 4, 5:
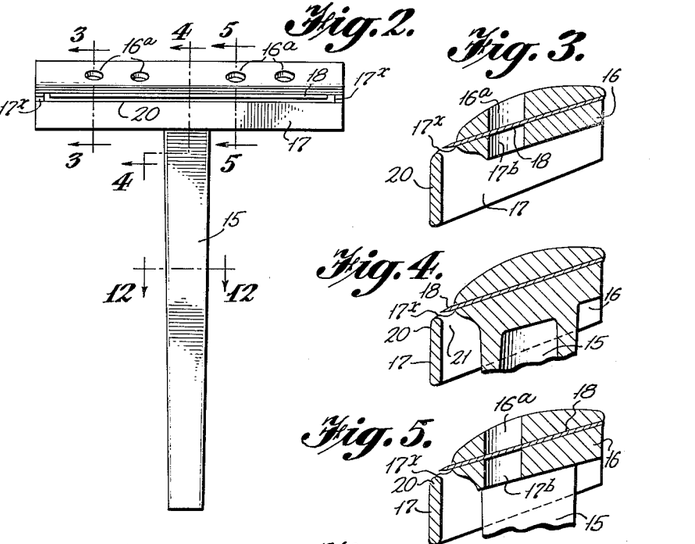
FIG. 2 is a front view of the razor looking directly toward the cutting edge of the safety razor blade.
FIG. 3 is a detail cross-sectional view on the line 3—3 of FIG. 2.
FIG. 4 is a detail cross-sectional view on the line 4—4 of FIG. 2.
FIG. 5 is a detail cross-sectional view on the line 5—5 of FIG. 2.

On the upper end of the handle 15 is the razor body portion 16, which is here illustrated as being integral with the handle 15. In FIGURES 3, 4 and 5, the underside of the body member 16 is shown as having an identation with a skirt or rim 17 on three sides, the front and two ends, to provide for the rigidity of the razor body as a whole.

In the top or face-contacting portion of the razor's body and in the upper relatively large surface of the indentation in the body portion (see FIGURES 3 and 5) are oppositely spaced holes 16$^a$ and 17$^b$ spaced opposite each other in pairs, and the openings are caused by spacing apart pins 16$^b$ and 17$^c$ (FIGURE 10) of the mold which retains the proper relative position of the safety razor blade 18 in the body space of the mold while the body portions of the pair of razors are being cast. The pins 16$^b$ and 17$^c$ are each, preferably, four in number and are shown as being placed in a straight line. These pins 16$^b$ and 17$^c$ together with the guide heads 19$^a$ (FIGURES 7 and 9) which extend between the two body members 16 and which are on the upper ends of the guiding fins 19, act, in part, to hold the razor blade in proper registration during the time the blades are being loaded prior to casting. Special attention is invited to the arrangement of these pins 16$^b$ nd 17$^c$ which are preferably in direct registration with each other. These bend the blade at 18$^y$ as well as held it in proper relative position in two planes in order that the cutting edges of the two parts of the blade are in proper relation to the co-operating body parts after casting, thus insuring that the blade-cutting edges will be in the proper positions to perform the beard-cutting function in a satisfactory and predetermined manner.

In the form of razor blade which I use, the cutting edge does not extend out the full length of the blade. As shown on FIGURE 7, the cutting edge stops short of the length of the blade and there are provided four cutaway corners 18$^c$ (FIGURE 7) which allow for the provision of a guard portion at the ends of the body member of the razor which I have designated 17$^x$ which are on a level with the blade edge and permit the passage of the razor over the face of the user without injuring the skin. These guard portions 17$^x$ are here shown as parts of the skirt 17 located adjacent the spaces 18$^c$ when the razor blade is incorporated in the razor structure. In addition, stops 50 are provided adjacent the guards 17$^x$ which will later be more fully described.

The blade 18, as preferably used, is similar in general construction and outline to the ordinary two-edge conventional blade for use in the ordinary safety razor. It is provided with two cutting edges, a long opening 18$^m$ on its long center line, which opening extends to within a short distance of the ends of the blade. At the ends of this opening 18$^m$, there are two narrow connecting portions which I provide with weakened lines 18$^y$ as clearly shown on FIGURES 7 and 8. These weakened lines provide portions of the blade which bend over the projections 19$^c$ when the razor blade 18 is bent to its place as shown in FIG. 9. These weakened portions 18$^y$ provide for places where the two-edge razor blade may be broken in half to form the two half-blades of the separated razors after they have been cast, as is clear from FIGURES 6, 7, 8, 9 and 11.

The action of the spacing pins 16$^b$, 17$^c$, ensures a pressing downwardly by the upper pins 16$^b$ and a pressing upwardly by the lower pins 17$^c$ on the upper and lower sides of the razor blade 18. Since there is one set of pins 16$^b$ and 17$^c$ for each half of a complete safety razor blade and since they are all set so as to press their respective surfaces of the razor blade, thus holding the blade in proper position, the proper placing of the blade is assured.

At the front of the safety razor body 16 there is a rail which forms a part of the rim 17 and extends the full length of the cutting blade.

The upper edge 20 of this rail is rounded for proper contact with the skin of the user. Its position with relation to the cutting edge of the blade is such that it will permi the skin of the user to be closely contacted by the blade but will prevent undue pressure of the cutting edge in a manner to cut the skin. As already pointed out, the ends of the safety razor blade are protected from cutting the user's skin by the points 17$^x$ in the same manner that the upper edge 20 of the rail 17 protects the skin of the user throughout the length of the cutting edge.

In the manufacture of this safety razor, the unbroken blade 18 is preferably placed over the head 19$^a$ of the fin 19, in position on the lower part of the mold, so as to be between the sets of pins 16$^b$, 17$^c$ which hold the blade when the mold forms are closed. When this is done, the separating fin 19 provided by the head 19$^a$ extends between the positions of the two back faces of the pair of body portions and extends upwardly and through the opening 18$^m$ between the halves of the razor blade to hold it from sliding as the blade becomes held by the pins 16$^b$, 1$^{\prime c}$. As the mold, to be described, is closed with the pins 16$^b$, 17$^c$ and the fin 19$^a$, all in position and in operation, the razor blade is held in its proper place for the casting of the plastic or other material used for making the body portions 16. The operation of the stops 50 which lock the blade in position will be later made clear.

After the casting has taken place, it is obvious that there will be two complete safety razor bodies, 16, each body enclosing one half of the blade and held together by the blade portions 18$^y$.

The handles 15 of the two razors are tapered outside and inside to facilitate removal from the mold. The handle openings in the mold are provided with cores 15$^a$ fastened to the stationary plate 71 below the knock-out plate 54, to be described, which extend into the handles. These handles are removed from the cores 15$^a$ after the casting operation, the cores 15$^a$ remaining fixed as the razors and their handles are raised by the knock-out plate 54.

The raising of the handles 15 to remove them from the mold is facilitated by the tubular knock-out pins 15ᶜ which are secured to the knock-out plate 54 and which surround the cores 15ᵃ, which cores 15ᵃ extend into the handle space of the mold to occupy the space within the handle 15. As the handle 15 is raised by the tubular knock-out pins 15ᶜ, the cores 15ᵃ are left behind.

The bodies of the two razors are held together by the weakened blade-portions 18ʸ shown in detail in FIGURES 8 and 11. By pulling apart on the lower ends of the handles after removal from the mold, as they are shown in FIGURE 9, the two razor bodies will break apart, which completes the manufacturing process.

In the manufacture of this razor, the parts of the mold are so closely placed that it is impossible for any of the plastic or other material of which the bodies are made to get to the cutting edges of the blade and avoids the necessity of clearing away the material after casting. This will be further set forth in the description of the mold, which will now be described.

I will now describe one form of my mold, which is adapted to make two castings at a time.

Figure 15:
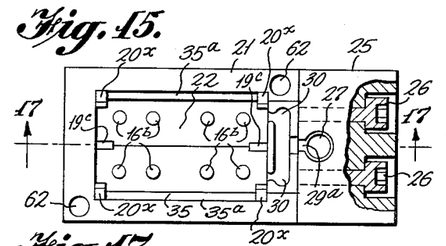
FIG. 15 is an underside showing of the upper mold section, and showing the spring-operated pins 16ᵇ.
Figure 16:
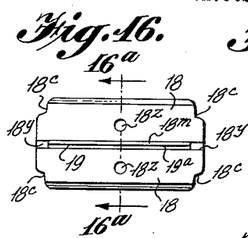
FIG. 16 is a plan view of the whole razor blade, and showing the openings 18ᶻ in the blade, with the fin 19 in place.
Figure 16A:
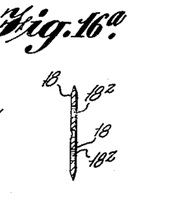
Figure 17:
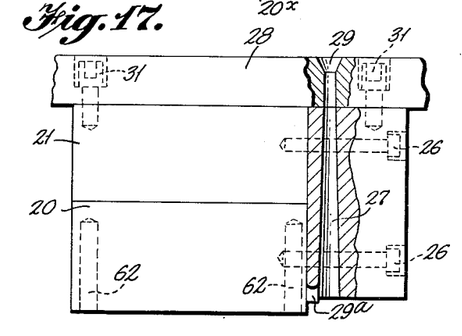
FIG. 17 is a partial sectional side view of an upper mold section showing the intake opening for the plastic.
Figure 18:
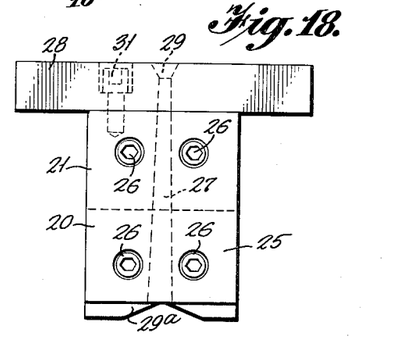
FIG. 18 is an end view of FIG. 17.

The blocks 20, 21, are rigidly connected to the block 25 by the screws 26 which pass through the block 25 as shown on FIGURES 15, 17 and 18. This block 25 serves as a body member for the channel 27. On the upper surfaces of the blocks 21 and 25 is a plate 28 which has a casting inlet 29 registering with the channel 27 and serves to carry the melted plastic or other material of which the razors are to be made. The channel 27 leads from the inlet 29 through the channel 27 to the gate 29ᵃ, through a cross channel 30 into the chamber 22 to cast the razor bodies. The plate 28 is secured to the block member 25 by the screws 31, shown in FIGURE 17. From this, it will be clear that the blocks 20 and 21 and the block 25 are all made rigid with the upper plate 28. It will be understood that the inlet 29 is connected to the casting machine (not shown).

Between the block members 20 and 21 are a plurality of spaced borings 32. These borings 32 have different diameters at different points in their length and are, in part, in blocks 20 and 21.

Figures 19, 20:
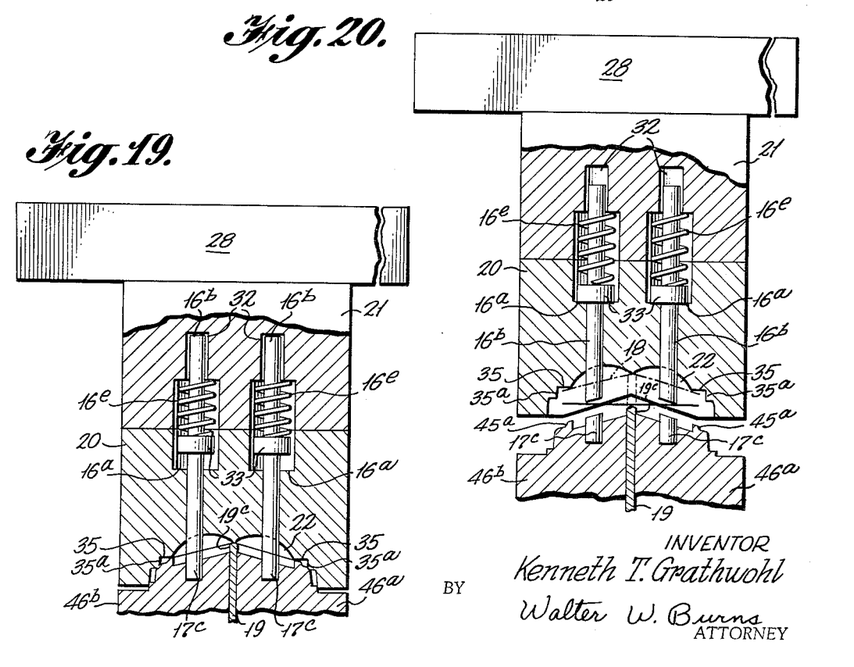
FIG. 19 is a sectional end view of an upper mold section showing the spring-pressed pins 16ᵇ in withdrawn positions and with the razor blade in place.
FIG. 20 is a view similar to FIG. 19 but with the parts in different positions, the pins 16ᵇ being in extended positions—ready to engage the blade to press it into casting position.

The adjusting pins 16ᵇ, already described, operate in these openings 32 and are provided with integral collars 33 set at points where the collars will, in extended position, rest on shoulders 16ᵃ, as shown on FIGURES 19 and 20. Springs 16ᵉ are provided to force the blade-engaging ends of the pins 16ᵇ against the outer side of the safety razor blade and force the blade to proper position. In assembling the block members 20 and 21 and before they are fastened in place, the pins 16ᵇ and the springs 16ᵉ are assembled and inserted into the borings 32. The ends of the pins 16ᵇ are cut to conform to the surface of the blade and are held against turning.

The springs 16ᵉ are of sufficient strength to bend the halves of the blade to proper position, holding the blades in position in separate planes for the casting operation.

The block 20 which is a part of the upper mold, is provided with surfaces 35 which are so placed that they will be contacted by the safety razor blade 18 adjacent its edges as it is placed in position for the casting of the plastic body of the safety razor. This surface extends from one cutaway blade portion 18ᶜ to the corresponding cutaway portion 18ᶜ at the opposite end of the razor position. This surface extends outwardly to a position near but out of contact with the actual cutting edge of the blade. There are two of these surfaces 35 and each one presses downwardly on opposite edges of the blade 18, as will be later made clear.

Beyond the cutting edges of the blade and at each of the corners are two registering mold projections which I call landing pads 20ˣ which are of a thickness to hold the upper and lower mold sections apart to allow for the razor blade and are integral with the upper and lower parts of the mold. It is thus clear that the outer surfaces of the pads 20ˣ and the corresponding surfaces of the blade halves will be in substantially the same plane when the molds are together and ready for the casting operation, with no space between the landing pads.

Figure 27:
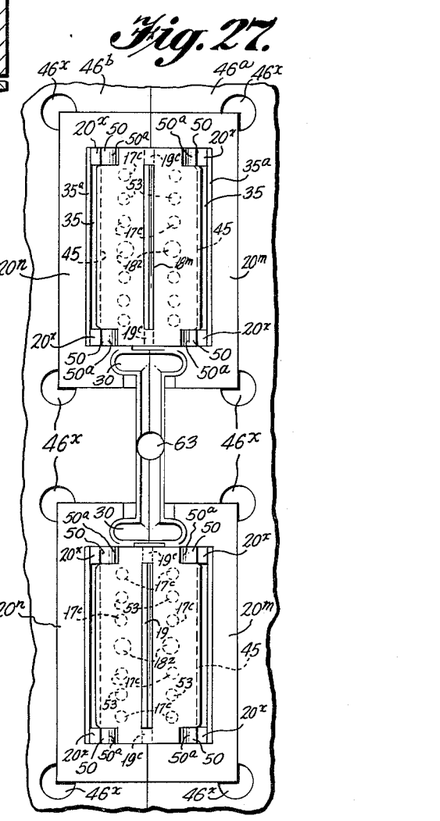
FIG. 27 is a fragmental view of the upper side of the lower part of the mold showing equipment to cast four razors.
Figure 28:
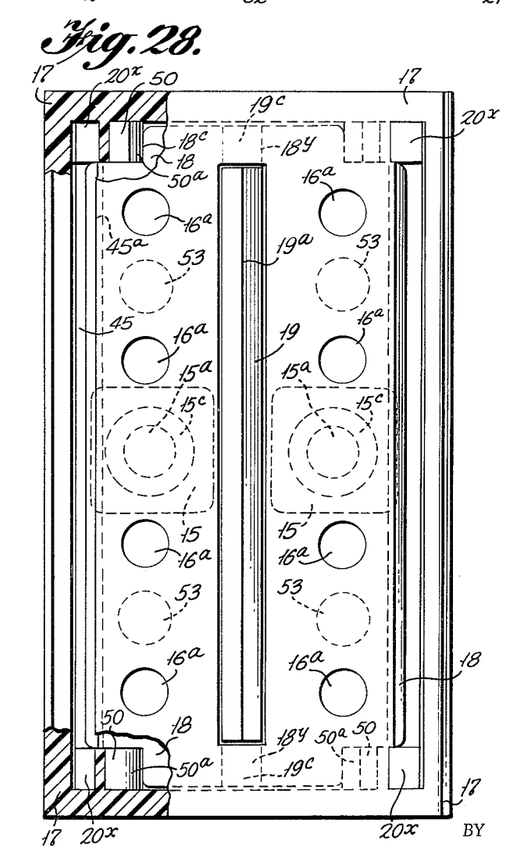
FIG. 28 is an enlarged view showing diagrammatically the blade and co-acting parts, parts being in section.

In FIGURES 21, 27, I have illustrated a form of mold wherein the steel mold blocks 20ⁿ, 20ᵐ are inset in openings in the mold members 46ᵃ, 46ᵇ and are accurately located by drillings 46ˣ indicated on FIGURE 27. The operation of the mold and its casting parts is the same for all forms of the mold blocks.

Extending upwardly through the opening 18ᵐ and between the halves of the blade is a movable fin 19 which in its outer or extended position extends from an opening in the members 46ᵃ and 46ᵇ a distance sufficient to receive a blade 18 when loading, the fin registering with the opening 18ᵐ in the razor blade, and extending downwardly to the knock-out block 54 which operates to remove the razor from the mold after it has been cast. As the mold is loaded with the razor blade, the blade opening 18ᵐ is made to register with the fin 19 which is in its outward position and the blade is dropped to its position on the lower mold portion. As the upper mold portion is brought to its position, it presses the fin 19 downwardly to a position where its upper edge 19ᵃ is adjacent the place of division between the two halves of the razor blade. The fin 19 operates as a divider between the two castings of the respective razor bodies and co-acts with the thin layer of plastic 49 (see FIGURE 9) which connects the two razor bodies and makes them easily separable after the casting operation has been completed.

There are four registration pins 16ᵇ which are spring-operated within the upper mold member 20 as already described. These spring-operated pins 16ᵇ provide sufficient resilient downward pressure to move the outer edges of the razor blade downwardly to their seats for the casting operation. As the outer edges of the blade approach their limit of movement at the lower position, it is to be borne in mind that the edges of the blade are forced behind stops 50 extending upwardly into the body space and that their curved edges guide the blade to positions behind these stops and in definite position against displacement, as will later be made clear. The resiliently operated pins 16ᵇ are in the illustrated form, eight in number, there being four for each razor body and all in operation at the same time to give a uniform pressure on the pins 16ᵇ. Each has an end properly formed to present a flat surface to the blade when at its lowest position. The pins 16ᵇ are constructed so that they cannot turn in their openings and are of a length so that when they are in their receded position, in the upper mold, will be stopped by the inner end of the opening 32 at a time that the springs 16ᵉ are at maximum compression, so that they cannot be compressed further.

Figure 13:
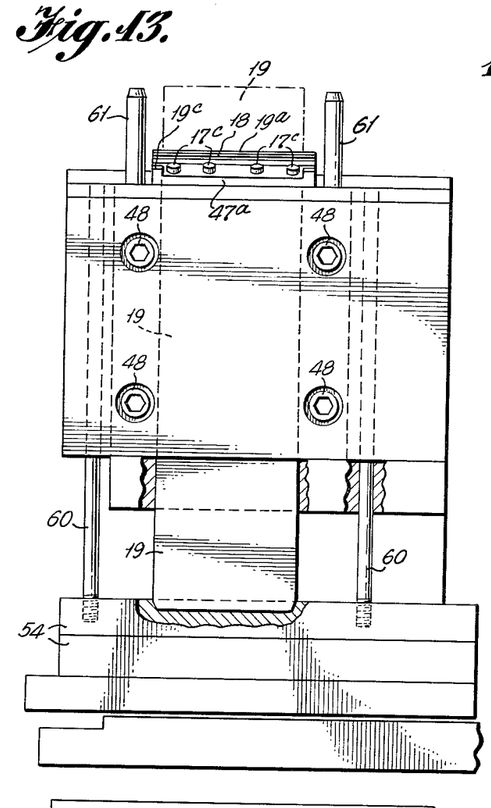
FIG. 13 is a side view of the lower mold with parts shown in section.
Figure 14:
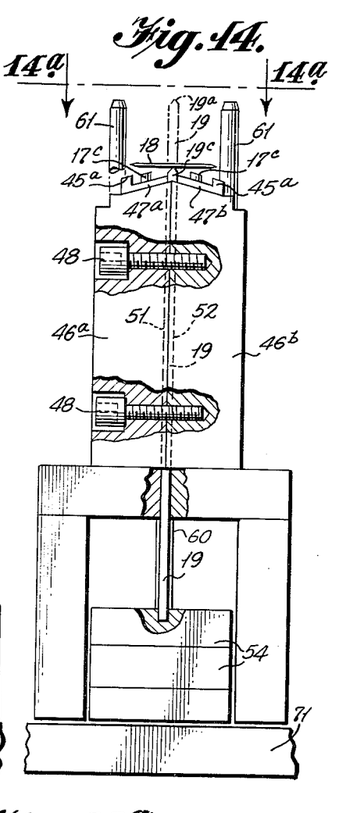
FIG. 14 is a view taken at a right angle to the showing of FIG. 13.
Figure 14A:
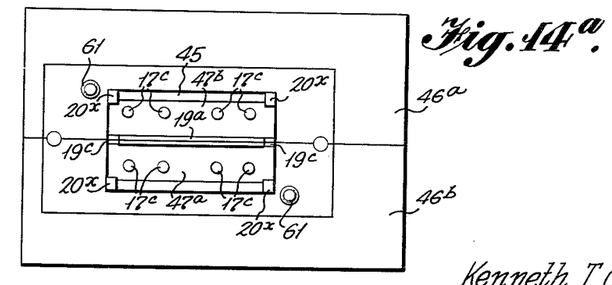

The lower mold portion of which the parts 16ᵃ and 46ᵇ are the primary members are held together by the bolts 48 which are well shown in FIGURES 13 and 14. As already indicated, they are provided with recesses 51 and 52, which are complementary to each other, to receive the fin 19, already described. This is well illustrated on FIGURE 14.

In the illustrated embodiment, the portion of the lower mold which forms the closure member of the casting chamber 22, is in the form of a projecting portion made up of two portions 47ᵃ and 47ᵇ which are similar in shape and each one respectively is a part of a lower mold member 46ᵃ, 46ᵇ. The portion which seals the blade edge chamber is designated 45 in FIG. 29.

Arranged on the upper portion of the parts 47ᵃ and 47ᵇ and within the chamber of the razor are several adjusting pins 17ᶜ which, as illustrated, are opposite the spring-pressed pins 16ᵇ. As illustrated, there are four pins 17ᶜ for each part of the two-part safety razor assembly and are shaped similarly to the pins 16ᵇ, already described, when they are in position to function.

Figure 26:
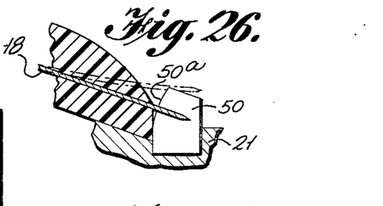
FIG. 26 is a diagrammatic view of the stop guide 50 showing the co-operation with the blade 18.

However, these pins 17c are rigid with the mold portions 47a and 47b. In addition, four guide pins 50 are preferably made of inset pins with their upper ends so shaped that they have a curved upper surface as at 50a to conform to the moving position of the blade 18 in the movement of the edge of the cut-away portions 18c of the blades. See FIG. 26. In other words, when the upper pins 16b contact the upper surface of the blade on both sides of the center line of the blade, the blade is held at the center line and the bending takes place about that line to bring the blade to its proper angularity as the pins 16b are forced to their lowest position. When they are near the lowest position, the pins 50 come into contact with the edges of the cut-away portions 18c and the pins 50 are so placed that the blade edge travels along the curved surface 50a of the pins 50 and at the very bottom position of travel, they snap into a fixed position due to the fact that the curve is at that point, away from the bending point. When this situation is reached, the edge of the blade will stay in that position, even if, as sometimes occurs, the blade should break at the weak places 18y as shown in FIGURE 7. This provides a safeguard against the blade halves becoming misplaced from the proper position for casting. It is to be understood that these stops 50 extend into the plastic space but are not long enough to contact the outer or face-contacting portion of the razor body and will leave an opening on the underside of the razor body which does not extend therethrough.

It is to be noted that these pins 50 are so shaped that the outer surface is not undercut to prevent the improper drawing from the mold; an dthat the curved surface 50a will draw well since it too is not under-cut in a manner to prevent drawing from the mold.

In order to assure that the twin-casting of the razors will come out of the molds in proper shape and without improper bending, I provide knock-out pins 53, two for each razor, making four in all, to assist in the removal of the razors from the mold. These knock-out pins are flush with the position of the inside of the plastic chamber while the parts are in position for casting and after the casting are in position just below and in contact with the razor body. After the casting operation is finished, the four knock-out pins 53 contact the body of the razor and as the knock-out plate 54 operates the knock-out pins 53 which are fastened to the knock-out plates, the razor is raised from the mold. It is to be noted that these four knock-out pins 53 are spaced so that each pin will tend to operate on one-half of a cast razor body and, since all of the knock-out pins operate in unison, the whole razor body will be lifted at once due to the uniform pressure applied throughout the length of the casting.

To assist in this uniform lifting action, the fin 19, already described, is located immediately below the center line of the two-blade assembly as the latter is ejected from the mold. Its lower end is secured to the knock-out block 54 and moves upwardly and downwardly as the latter is so moved. When the knock-out block 54 moves upwardly, the two portions of the mold—the upper and lower portions—are separated by the separating pins 60 and the fin 19 moves upwardly simultaneously with the four pins 53 below the four quarters of the two-razor assembly, along with the sleeves 15c below the handles 15, already described. It thus appears that in addition to the separating pins 60 which separate the two parts of the mold, there are in addition four pins 53 which are below the centers of the four quarters of the razor assembly, two knock-out sleeves 15c which surround the cores 15a of the razor handles 15 and the fin 19, all lifting upwardly from the knock-out plate 54 below, to force the razors upwardly after the casting operation. Thus we see that there are seven parts which assist in the raising of the razors to an elevated position for separation from the mold. All these parts are secured at their bottoms to the knock-out plate 54 illustrated in FIGURES 13, 14, 22, 23, 24, 25, 30 and 31.

In order to cool the molds and control the operating temperatures, I provide a water circulating system, for which the openings 70 are provided for connection to the water pump and water heater of the casting machine. As these items are not a part of the invention, per se, they are not described or illustrated in detail.

I will now describe the operation of the mold and the casting operation as a whole.

The lower mold is in the position as illustrated in FIGURE 13 with the knock-out block 54 and the fin 19 in its upper position. The double edge safety razor blade 18 is placed over the fin 19 with the opening 18m in the blade 18 registering with the body of the fin 19. The blade drops down in contact with the mold and is held from improper registration since the opening 18m in the blade is but slightly larger than the fin 19.

The upper half of the mold is now lowered into position for the pin guides 61 of the lower mold to register with corresponding holes 62 in the upper mold. These guides and openings are such that when they register, the two parts of the mold will be in proper registration when joined.

As the upper mold is lowered, the guides 61 and the corresponding holes 62 register with each other. The blade 18 is in contact with the lower mold loosely, the upper mold pressing downwardly on the fin 19 to force the knock-out plate 54 and all the knock-out pins provided for knocking out the cast razors downwardly to their lowered positions. After the fin 19 and the sleeves 15c of the handles, which act as knock-out pins, reach their lowermost positions, the eight pins 16b push downwardly. As the blade 18, as a whole, cannot go further in a downward direction due to contact witht he blade rests 19c, the pins 16b move the outer edges downwardly, further bending the blade at the weak portions 18y As the edges of the cut-away portions 18c at the corners of the blade approach the stop guides 50, the edges of the cut-away portions come into contact with the curved edges 50a of the stop guides 50. Further pressing downwardly by the upper mold member causes the cut-away portions to ride downwardly until these edges are below the place of the shortest distance from the bend 18y of the blade. At this point the blade edges of the cut-away corners 18c engage the stop guides 50 substantially where they are set in the face of the mold. At this point, all four corners of the blade snap behind the stop guides 50 and the whole blade 18 will be held behind the stop guides 50, even though the blade breaks at the weakened places 18y. Further movement of the upper mold in a downward direction will cause a compressing of the pressing pins 16b against their springs 16e until the pins 16b reach their retracted position where the upper ends of the pins 16b will engage the tops of their openings as shown in FIGURES 19 and 20.

At this point, each half of the blade which is bent at the points 18y, assumes its position in its plane, the planes of the blade halves being at the proper angle to function in the finished razor.

At this point, where the pins 16b cannot be pressed further into their openings, there is a direct pressure action on the ends of the pins 16b, which pressure is transmitted to the razor blade. When this takes place, the razor blade is pressed further to engage the stationary pins 17c. At this point, the upper mold member has reached its lowermost position and the mold and razor space are in position for casting.

For the casting operation, the mold parts are cooled by the circulating water through openings 70 to the proper temperature as is well understood in the art. The foregoing description is intended to refer to the parts of the mold and molding machine as illustrated. Since the molding machine is not a part of the present invention, per se, as already stated, further description of the machine is omitted.

In order that the sealing off of the plastic or other material may be complete to prevent the formation of plastic fins at places where the parts come together, I have provided tight joints to prevent the passage of the molten material. There are two sets of sealing parts of the mold; one set takes care of the need to prevent the passage of the molten material to places where it might come into contact with the cutting edge of the razor blade. In considering these anti-leakage arrangements, it is understood that the construction for one razor and half-blade is a duplicate of the other razor and half-blade, the cross channel 30 being common to the two razors for the supply of the material to the dual molds' cavities.

Near the opposite long sides of the chamber 22 and integral with the block 20 are two ribbon-shaped surfaces 35 which contact the blade adjacent its cutting edge form a part of the wall which prevents the molten plastic from coming into contact with the razor blade edge during the casting operation by confining the razor edges within chambers. Since no plastic comes into contact with the edge of the blade, it is not necessary to remove any of the plastic after casting.

Figure 29:
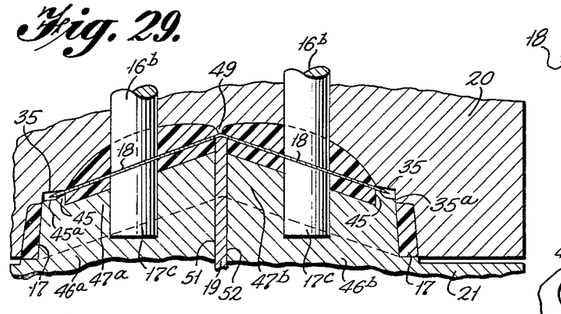
FIG. 29 is an enlarged diagrammatical showing in detail, a cross-section of the mold and its razors and blades after molding.
Figure 30:
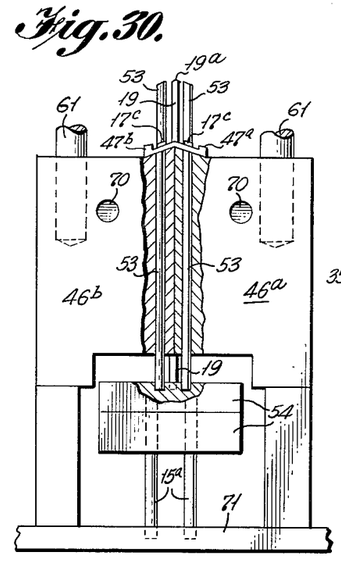
FIG. 30 is a partial sectional view of the lower mold showing details of the knock-out pins 53.
Figure 31:
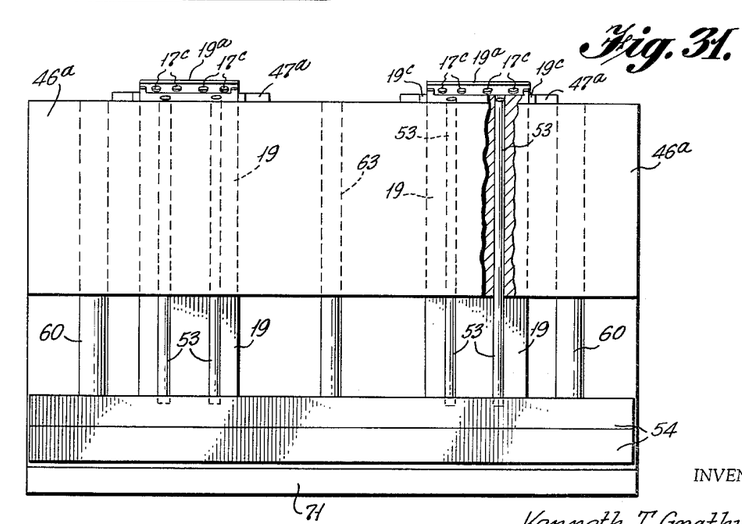
FIG. 31 is a sectional view at 90° to FIG. 30.
Figure 32:
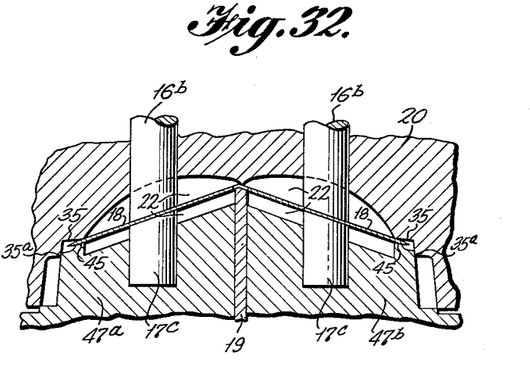
FIG. 32 is a sectional diagrammatical view of the casting space and adjacent parts but without the casting material.

In FIGURE 29, the chamber formed by the surfaces 35 and the landing pads $20^x$, are somewhat distorted for the sake of illustration.

Along the outer edge of the ribbon-shaped surface 35 are vertical walls $35^a$ which extend downwardly and are placed to be opposite to, but to clear, the cutting edges of the blade 18.

In order to assist in sealing the small elongated compartment occupied by the cutting edge of the blade when the casting operation is being accomplished, I provide another narrow small elongated surface 45, which extends slightly upwardly from the lower mold blocks $46^a$, $46^b$. See FIG. 29. This elongated surface 45 has several functions. When the parts are assembled for casting, the surface 45 contacts the lower side of the blade adjacent to the cutting edge and makes it tight, at this place, against the entry of the molten plastic. It also extends close to the outer cutting edge of the razor blade, thereby leaving an opening clear through the body of the razor, when removed from the mold, to allow passage of the lather from the face of the user.

Figure 22:
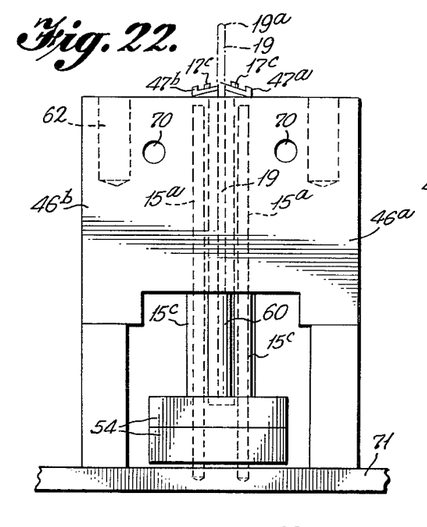
FIG. 22 is an end view of a modification of the mold which is to cast four razors at the same time and showing the operation of the knock-out plate 54 in down position.
Figure 23:
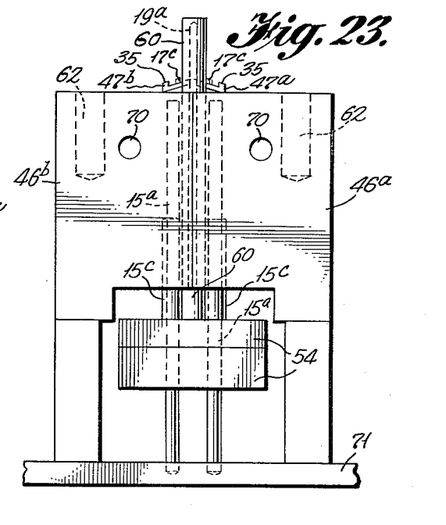
FIG. 23 is a view of the structure of FIG. 22 but with the knock-out plate 54 in up position.
Figure 24:
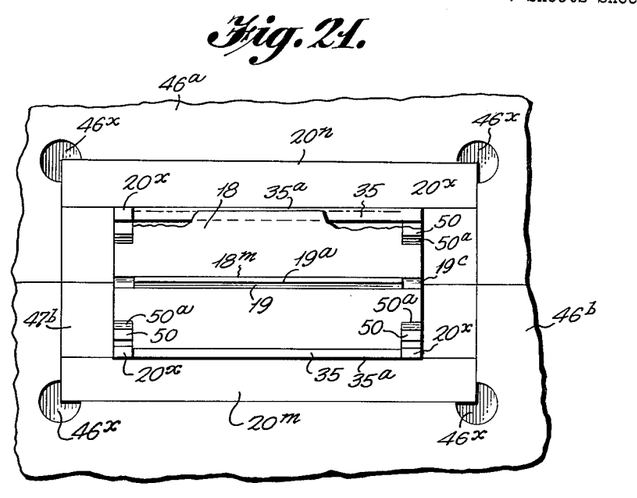
FIG. 24 is a view similar to FIG. 23 but at 90°.
Figure 25:
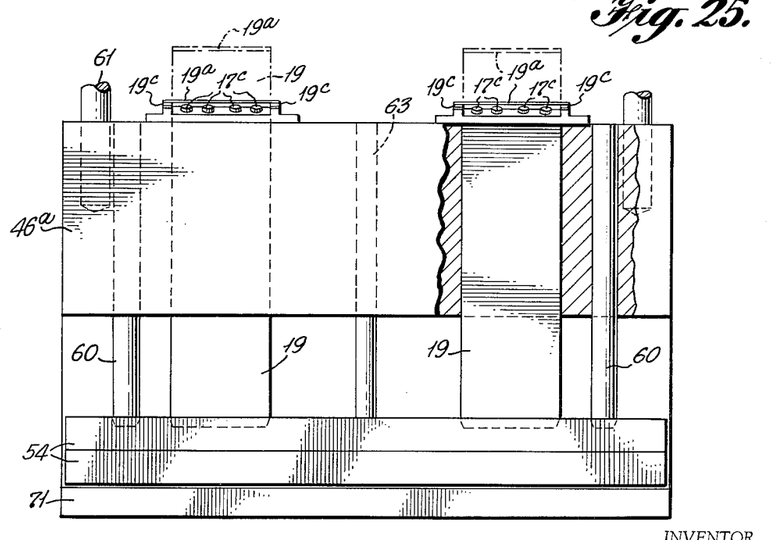
FIG. 25 is a view similar to FIG. 22 but at 90°.

The outer upper edge of the mold blocks portions $47^a$, $47^b$ of FIG. 22 contact the vertical wall $36^a$ and make a tight joint to prevent entry of the plastic to contact the razor blade. The ends of the blade fit against the landing pads $20^x$ and prevent leakage at that point.

The entry of the molten plastic is prevented at the ends of the compartment by the landing pads $20^x$ at the ends of the surfaces 35 to thus complete the sealing construction.

This portion of the lower mold is in two similar complementary parts, which I have designated as $46^a$, $46^b$, and is shown well on FIGURE 14. This portion of the lower mold comprises two similar portions of the block members $47^a$ and $47^b$ which are complementary to each other.

These portions $46^a$ and $46^b$ form walls of the chamber 22 and by their end and outer sides form the space for the razor blade bodies and sealing walls of the chamber 22, thus confining the molten plastic or other material to form the safety razor body.

The two complementary members $47^a$, $47^b$, are held together by the screw members 48 (FIGS. 13, 14) which are preferably countersunk into one of the members $46^a$, $46^b$, and screwed into the other as shown on FIGURE 14.

Between the two mold members $47^a$, $47^b$, I provide a blade guide $19^a$, already mentioned, which extends outwardly from between projecting portions $47^a$, $47^b$.

Where the fin 19 separates the main portions of the two body portions of the razors, there is a small space. This space forms a thin layer of plastic as the two body portions of the razors are cast. As this space becomes filled with the plastic which is in line with the joining portions $18^y$ of the razor, they form a continuous web 49 which assists the fin 19 as the latter is raised by the knock-out block, to hold the two razor bodies stable and together until such time as they are to be separated by pulling apart the handles 15 to separate the razors for use. This web also helps the fin 19 to raise the razor bodies at a uniform pressure so that there is a tendency to prevent warpage.

It will be noted that the top $19^a$ of the fin has a V-shape cross section which promotes a gripping action of the upper surface $19^a$ on the plastic material which further assists the raising of the razor bodies while maintaining the web 49 intact until broken as described.

It is to be understood that the outer perimeter of the portions $46^a$, $46^b$ and the coacting complementary portions of the upper mold member are provided with corresponding well-fitted coacting walls which contact the walls $36^a$ and make the escape of the casting material impossible.

In the mold as used, the top surfaces $45^a$ of the projecting portions $46^a$, $46^b$ are substantially continuous with the blade contacting surfaces 45 which are accentuated in FIG. 29 for purposes of illustration.

While I have illustrated and described in detail embodiments of my invention, it is to be understood that the disclosure is merely illustrative and that modifications and changes may be made without departing from the spirit of the invention and within its scope as claimed.

Having described my invention, what I claim is:

1. A mold which is designed for use to cast disposable safety razors more rapidly, said mold comprising in combination:
    (a) complementary mold members,
    (b) a pair of chambers in the mold, each chamber being of the shape of a safety razor, and adjacent each other,
    (c) a space of a shape to receive a commercial type two-edge safety razor blade,
    (d) each half of the blade being provided with a space of appropriate shape and size to receive the half blade,
    (e) the mold being provided with means for bending the blade along a central axis as the complementary mold members are moved toward each other, and
    (f) casting conduit connections to the chambers.

2. A mold which is designed for use in casting disposable safety razors more rapidly, said mold comprising in combination:
    (a) complementary mold members,
    (b) a pair of casting chambers in the mold, each chamber being of the shape of a safety razor, and adjacent each other,
    (c) a space in each chamber of the mold to receive one-half of a commercial-type two-edge safety razor,
    (d) the mold being provided with means for bending the blade along the central axis as the complementary mold members are moved toward each other and then,
    (e) holding the separate halves of the blade in planes at an angle to each other in the respective casting chambers until completion of the casting.

3. A mold which is designed for casting two disposable safety razors simultaneously with half of a commercial-type two-edge safety razor blade within the body of each razor, said mold comprising:
    (a) complementary mold members,
    (b) a pair of chambers in the mold, each having the shape of a safety razor, and adjacent each other,
    (c) the mold providing for the simultaneous casting of integral handles and in adjacent parallel relation, and
    (d) knock-out means for forcing the pairs of razors with handles attached, out of the mold forms.

4. A mold which is designed for casting two disposable safety razors simultaneously with half of a commercial-type two-edge razor blade within the body of each razor, said mold comprising:
  (a) complementary mold members,
  (b) a pair of chambers in the mold, each having the shape of a safety razor, and adjacent each other,
  (c) a space for receiving a commercial-type two-edge safety razor blade in position with one half of the razor blade within each chamber, and
  (d) means in the mold to hold the blade halves in predetermined positions with their halves in planes at predetermined angles as the blade-holding means move during the closing of the mold.

5. A mold which is designed for casting two disposable safety razors simultaneously with half of a commercial type two-edge razor blade within the body of each razor, said mold comprising:
  (a) complementary mold members,
  (b) a pair of chambers in the mold, each having the shape of a safety razor, and adjacent each other,
  (c) a space for receiving a commercial-type two-edge safety razor blade in position with one half of the razor blade within each chamber,
  (d) means in the mold to hold the blade halves in predetermined positions with their halves in planes at predetermined angles as the blade-holding means move during the closing of the mold, and
  (e) a portion of the blade-half holding means, being spring pressed to resiliently hold the blade halves in place.

6. A mold which is designed for casting two disposable safety razors simultaneously with half of a commercial-type two-edge safety razor blade within the body of each razor, said mold comprising:
  (a) complementary mold members,
  (b) a pair of chambers in the mold, each having the shape of a safety razor, and adjacent each other,
  (c) the mold providing for the casting of handles on the razors in positions adjacent to each other, and
  (d) knock-out means operating on both razors simultaneously to knock out the two razors, as a unit, at the same time from the mold.

7. A mold which is designed for casting two disposable safety razors simultaneously with half of a commercial type two-edge safety razor blade within the body of each razor, said mold comprising:
  (a) complementary mold members,
  (b) a pair of chambers in the mold, each having the shape of a safety razor, and adjacent each other, and
  (c) an outwardly extending fin between the positions of the two razor casting chambers, slidably movably upwardly when the chambers are empty, to receive the razor blade over the fin to hold the blade in position for closing.

8. A mold which is designed for casting two disposable safety razors simultaneously with half of a commercial type two-edge safety razor blade within the body of each razor, said mold comprising:
  (a) complementary mold members,
  (b) a pair of chambers in the mold, each having the shape of a safety razor, and adjacent each other,
  (c) the mold providing for the casting of handles on the razors in positions adjacent to each other, and
  (d) an outwardly extending fin member between the positions of the two razor casting chambers,
  (e) the fin having a sliding relation to the mold to extend outwardly when the mold chambers are full of castings to remove the castings from the mold, and in position when in extended position, to receive a safety razor by registration with the slot in the razor.

9. A mold which is designed for casting two disposable safety razors simultaneously with half of a commercial type two-edge safety razor blade within the body of each razor, said mold comprising:
  (a) complementary mold members,
  (b) a pair of chambers in the mold, each having the shape of a safety razor, and adjacent each other,
  (c) the mold providing for the casting of handles on the razors in positions adjacent to each other,
  (d) an outwardly extending fin member between the positions of the two razor casting chambers,
  (e) the fin having a sliding relation to the mold to extend outwardly when the mold chambers are full of castings to remove the castings from the mold, and in position when in extended position, to receive a safety razor by registration with the slot in the razor,
  (f) the fin having an outer angular edge in position below a line between the adjacent positions of the razor casting chambers, and
  (g) a knock-out plate attached to the fin for assisting in removal of the castings from the mold.

10. A mold which is designed for use in casting disposable safety razors more rapidly, said mold comprising in combination:
  (a) complementary relatively movable mold members,
  (b) a casting chamber for receiving one-half of a commercial safety razor blade,
  (c) means movable with the mold portions to bend the blade along a center line to a predetermined angle,
  (d) stop-guide means for guiding opposite edges of the blade to a predetermined position, and
  (e) to hold the blade in that position upon its arrival there.

References Cited by the Examiner
UNITED STATES PATENTS

| | | |
|---|---|---|
| 1,864,995 | 6/32 | Frost. |
| 2,231,556 | 2/41 | Arpin _______________ 264—157 |
| 2,347,596 | 4/44 | De Swart. |
| 2,720,003 | 10/55 | Harris et al. _________ 264—157 |
| 2,789,346 | 4/57 | Algier et al. |
| 2,881,503 | 4/59 | Johnson _____________ 264—157 |
| 3,030,661 | 4/62 | Strong _______________ 18—34 |
| 3,051,774 | 8/62 | Schelke ____________ 264—272 X |
| 3,093,432 | 6/63 | King _______________ 264—272 X |
| 3,095,610 | 7/63 | Sawyer _______________ 18—34 |

J. SPENCER OVERHOLSER, Primary Examiner.

ALEXANDER H. BRODMERKEL, WILLIAM J. STEPHENSON, Examiners.